United States Patent [19]

Hill

[11] 4,015,496
[45] Apr. 5, 1977

[54] DIMPLELESS TUBE CUTOFF DEVICE
[75] Inventor: Donald R. Hill, Elmhurst, Ill.
[73] Assignee: Hill Engineering, Inc., Addison, Ill.
[22] Filed: Feb. 6, 1976
[21] Appl. No.: 655,885
[52] U.S. Cl. .................. 83/466.1; 83/54; 83/555
[51] Int. Cl.² ........................ B26D 3/16
[58] Field of Search .......... 83/54, 555, 554, 574, 83/580, 466.1

[56] References Cited
UNITED STATES PATENTS

| | | | |
|---|---|---|---|
| 1,748,266 | 2/1930 | Wikle | 83/555 X |
| 3,119,296 | 1/1964 | Foster | 83/54 X |
| 3,754,428 | 8/1973 | Alexoff | 83/54 X |
| 3,864,996 | 2/1975 | Morgolenko et al. | 83/54 X |
| 3,143,018 | 8/1964 | Everett | 83/214 |
| R22,114 | 6/1942 | Borzym | 83/54 X |

Primary Examiner—Frank T. Yost
Attorney, Agent, or Firm—Wegner, Stellman, McCord, Wiles & Wood

[57] ABSTRACT

A tube cutoff apparatus arranged to provide an improved cutoff of a tube avoiding dimpling of the tube. The apparatus includes an improved blade configuration and mechanism for moving the blade in different directions to effect a multistep tube cutoff. In a first step, the tube is chordally notched, and in a second step, the tube is diametrically sliced to provide a dimpleless cutoff.

14 Claims, 7 Drawing Figures

DIMPLELESS TUBE CUTOFF DEVICE

BACKGROUND OF THE INVENTION

1. Field of the Invention

This invention relates to tube cutoff apparatuses and in particular to such apparatuses utilizing blade cutoff means.

2. Description of the Prior Art

As shown in U.S. Pat. No. 683,289 of Hugo John, girders, angle irons, and the like, may be cut by firstly providing a double "drawing" punch cut and subsequently providing a double drawing shearing cut. The cutter punches the work with a point to produce a hole and is then swung in an arc to complete the shearing cut.

Other apparatuses pertinent to the problem of cutting metal shapes include that of Henry C. Jones U.S. Pat. No. 535,207, wherein knives cut through the web of a beam and subsequently sequentially cut the flanges.

In U.S. Pat. No. 786,236 of William Ross, a press is shown having a pair of blades in cooperating stationary shearing devices.

In Hugo John U.S. Pat. No. 841,979, a metal cutting machine is disclosed wherein an upper cutter is mounted on a balance beam rotatable about a pin to cut the iron by movement in opposite directions.

In U.S. Pat. No. 861,122 of Hugo John, a metal cutting machine is shown providing both left cuts and right cuts of the girder flanges.

In U.S. Pat. No. 995,252 of Hugo John, a girder cutting device is shown wherein T girders are cut in a downward operation and a subsequent upward operation with the girder being moved laterally prior to making the second cut.

E. V. Wurtz discloses, in U.S. Pat. No. 1,241,259, a machine for operating on structural beams wherein cuts on the flange and web are made in successive operations. The cutter has a plurality of cutting edges for cutting different portions of the beam.

Thomas D. Williams, in U.S. Pat. No. 1,758,019, provides shearing blades which firstly cut downwardly to penetrate the material to be sheared and which are then forced apart to shear the material on opposite sides of a penetrating point. The blades are spread outwardly in opposite directions to effect simultaneous cutting by each of the blades.

A. S. Liss et al, in U.S. Pat. No. 2,413,980, show a shearing apparatus utilizing a cam member for moving a shearing die for cutting different portions of the workpiece.

Kurt W. Nebel, in U.S. Pat. No. 2,581,694, discloses shears which initially pierce the work to permit a subsequent free swinging of the cutting unit to complete the shearing of sheet metal.

Charles M. Brehm, in U.S. Pat. No. 2,837,156, shows a tube cutting die having shearing strokes substantially perpendicular to each other in cutting tubular stock.

Joseph W. Reis et al, in U.S. Pat. No. 3,451,297, show a shearing device utilizing a primary die and a secondary die for minimizing die stresses and preventing formation of an edge burr on the sheared material.

In one prior art tube cutoff device, a pointed blade is moved vertically into the tube and a horizontal blade is provided for cutting horizontally to provide a two-step cutting operation.

SUMMARY OF THE INVENTION

The present invention comprehends an improved tube cutoff apparatus for providing dimpleless cutting of tube stock in a novel and simple manner.

The invention comprehends providing a novel cutoff blade configuration which firstly effects a notching of a portion of the tube and secondly effects a slicing through of the tube to complete the cutoff.

The apparatus effects a first movement of the blade chordally through the portion of the tube to be notched, and upon completion of the notching operation, returns the blade to a centered position for subsequent diametric slicing of the tube to complete the cutoff.

The blade includes a hook-shaped notching portion and opposite slicing edges diverging from the hook portion.

In the illustrated embodiment, the slicing edges have different angles.

The blade may be supported by a support means to extend transaxially adjacent the tube at the start of the cutoff operation. The apparatus may include means for moving the blade firstly to cause the notching of the tube portion and subsequently to effect the slicing thereof. The blade movement more specifically may be effected by cam means. The blade positioning may be cooperatively effected by the cam means and biasing means.

The blade may be retained against movement diametrically through the tube during the notching operation by lockup bars which may be repositioned to permit subsequent diametric movement of the blade in the slicing operation. The movement of the lock-up bars may be effected by lock-up cams mounted for movement with the blade moving cam. In the illustrated embodiment, the lock-up bars are pivotally mounted to the apparatus support means.

Thus, the invention comprehends an improved tube cutoff apparatus which is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
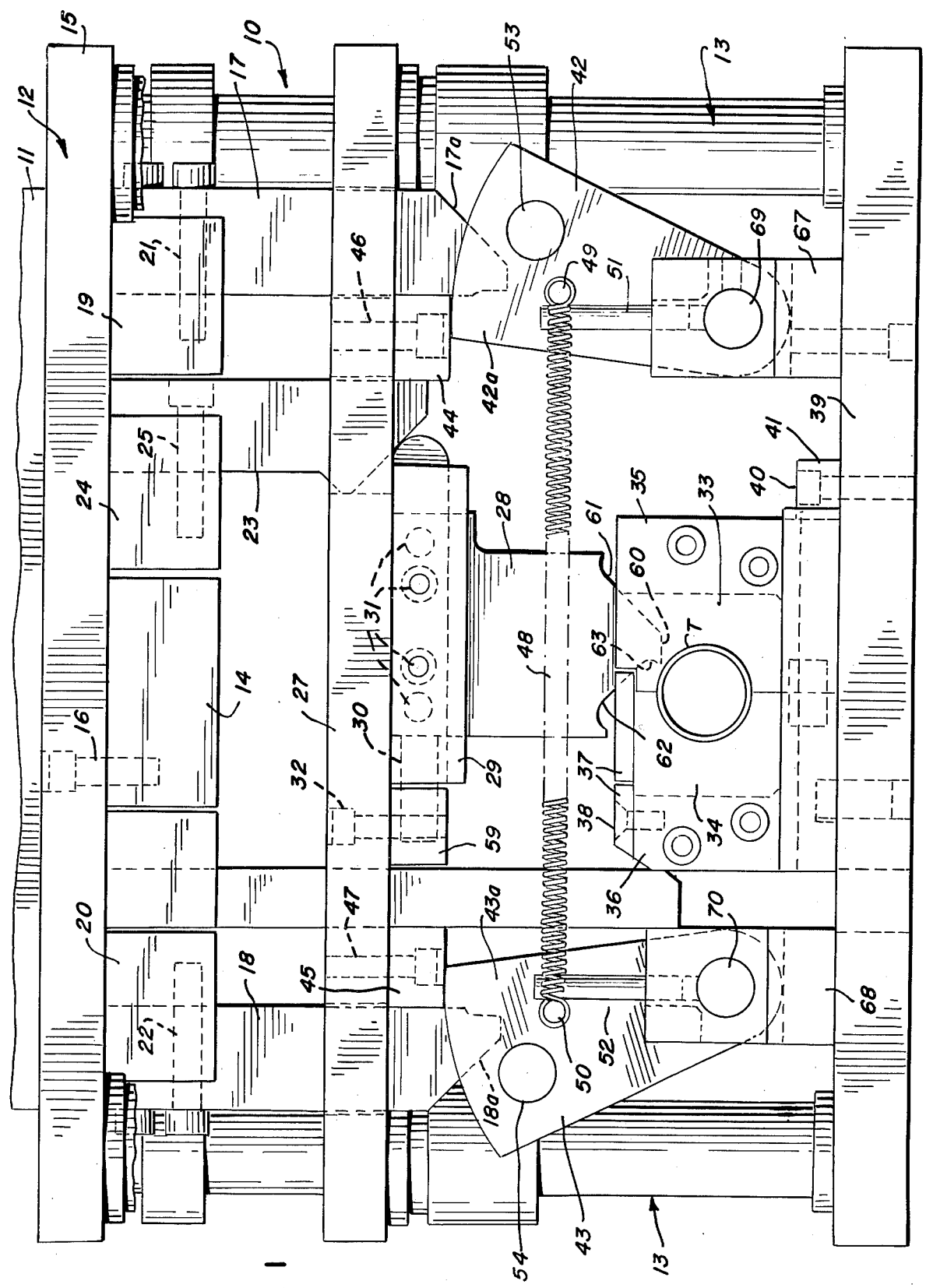
FIG. 1 is a front elevation of a tube cutoff apparatus embodying the invention.

In the exemplary embodiment of the invention as disclosed in the drawing, an apparatus generally designated 10 is shown to comprise a tube cutoff apparatus for cutting off a tube T with a dimpleless cut. The term "dimpleless" cut herein is defined as one wherein the tube is effectively cut through without deforming the tube in the area initially encountered by the cutting blade. The present invention effects the dimpleless cut by providing firstly a notching of the tube and subsequently completing the cutoff operation by a diametric slicing of the tube. The apparatus may be utilized in a suitable press means, such as a punch press 11, having a punch holder 12 which effects the tube cutoff operation herein by a conventional punch press vertical reciprocal movement of the punch holder.

More specifically, as shown in FIG. 1, the punch holder may be mounted on a plurality of leader guide pin and bushing assemblies generally designated 13 of conventional construction adapted to guide the punch holder in a vertical path during the tube cutoff operation.

Figure 5:
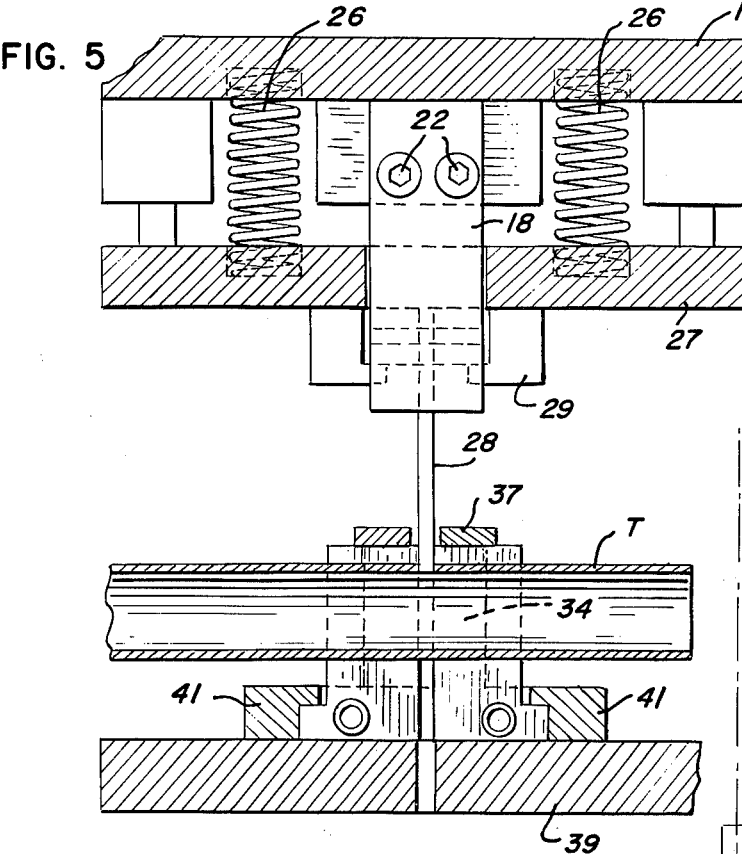
FIG. 5 is a fragmentary vertical section taken substantially along the line 5—5 of FIG. 2.
Figure 6:
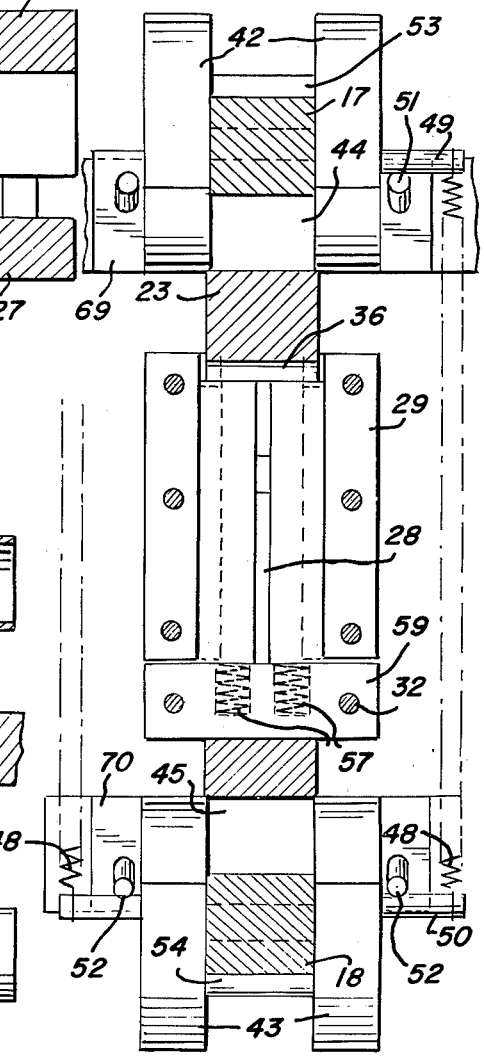
FIG. 6 is a fragmentary horizontal section taken substantially along the line 6—6 of FIG. 2.

A striker block generally designated 14 is secured to an upper portion 15 of the punch holder by suitable means such as screw 16. A pair of lock-up cams 17 and 18 are secured to the punch holder portion 15 by suitable retainers 19 and 20, respectively, by means of screws 21 and 22. Further, a blade cam 23 is secured to the punch holder portion 15 by a third retainer 24 and screw means 25. As shown in FIG. 5, coil springs 26 may be provided between upper punch holder portion 15 and a lower punch holder portion 27 to which the cutting blade 28 is secured by means of a bracket 29 slidably supporting a blade drive bar 30 to which the blade is secured by pins 31. As shown in FIG. 1, bracket 29 may be secured to the punch holder portion 27 by suitable screw means 32. As further shown in FIG. 1, blade 28 is carried to extend transaxially to the tube T which may be supported in suitable split die inserts 33 and 34 removably carried in corresponding die insert holders 35 and 36, respectively. The die inserts may be secured in the holders by suitable retaining plates 37 secured to the die insert holders by suitable means, such as screws 38. The apparatus may be mounted to the die shoe 39 of the punch press, as shown in FIG. 1, with the die insert holders being secured thereto by suitable screws 40 and retainer blocks 41, as shown in FIGS. 1 and 5.

Downward movement of the punch holder portion 27 is prevented during the initial downward movement of the punch holder portion 15 by a pair of lock-up bars 42 and 43 having portions 42a and 43a, respectively, disposed in the path of movement of stop blocks 44 and 45 secured to the punch holder portion 27 by suitable screws 46 and 47, respectively. The lock-up bars are swingably carried on the support 39 by mounting members 67 and 68, respectively. The lock-up bars are pivotally mounted to the mounting members 67 and 68 by pivots 69 and 70, respectively.

The lock-up bars are positioned, as shown in FIG. 1, to place portions 42a and 43a in the blocking position by a tension spring 48 extending between spring holders 49 and 50 on lock-up bars 42 and 43, respectively. The swinging toward each other of the lock-up bars is limited by the abutment of the spring holders 49 and 50 with stops 51 and 52 so as to dispose the lock-up bars in the position of FIG. 1 prior to the initiation of the cutoff operation. The lock-up bars are provided with cam followers 53 and 54, respectively, adapted to be engaged by lower cam surfaces 17a and 18a of lock-up cams 17 and 18, respectively, when the punch holder portion 15 reaches the position of FIG. 2.

Figure 2:
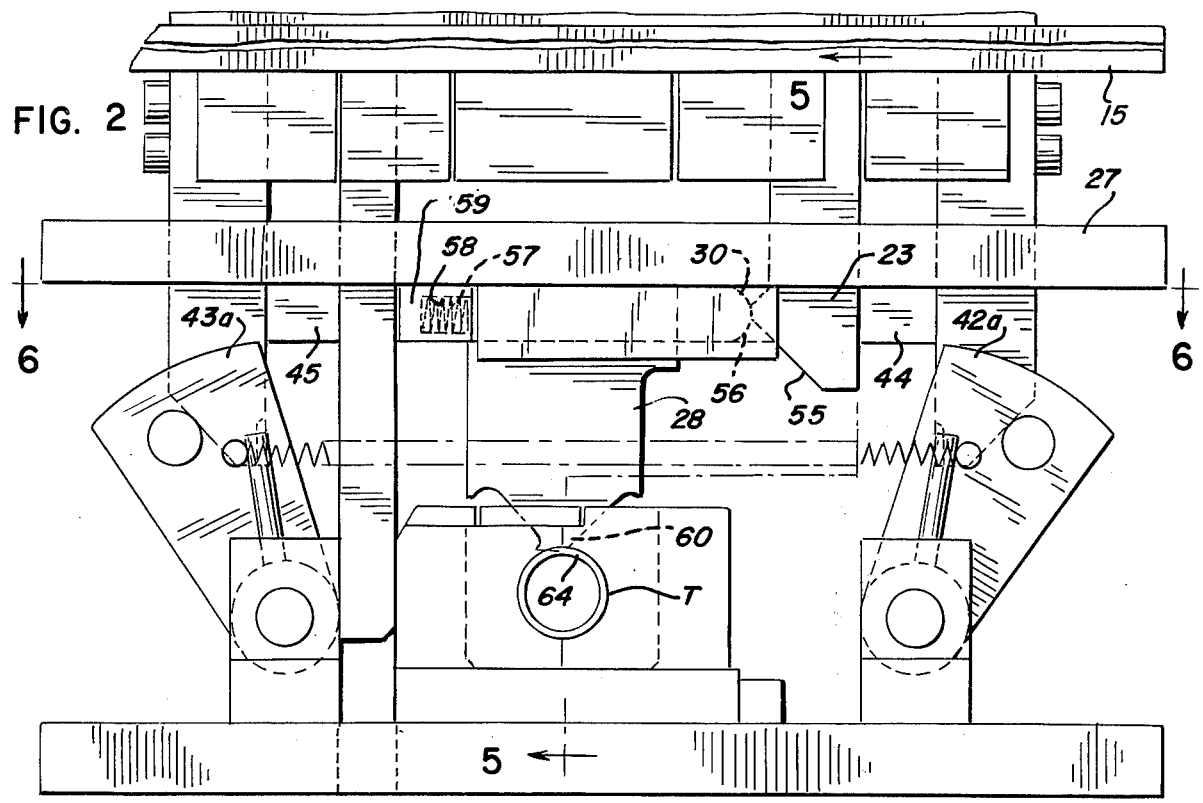
FIG. 2 is a front elevation thereof as arranged upon completion of the notching operation.

During the downward movement of the punch holder portion 15 to the position of FIG. 2, the lower punch holder portion 27 is locked against downward movement until such time as the punch holder portions 42a and 43a are swung clear of the stop blocks 44 and 45, thereby preventing downward movement of the blade 28. However, downward movement of the punch holder portion 15 during this time causes leftward movement of the blade drive bar 30 as a result of the engagement of cam surface 55 of the blade cam 23 with the righthand cam follower portion 56 of the blade drive bar. As shown in FIG. 2, the blade drive bar is biased against the blade cam by a compression spring 57 received in a suitable recess 58 in the lefthand end portion 59 of the bracket 29.

As best seen in FIG. 1, blade 28 defines a notching tip portion 60 and a pair of slicing edges 61 and 62 diverging away from notching tip portion 60. Edge 62 may be inclined somewhat more than edge 61 and extends from the upper end of an arcuate hook portion 63 of the notching tip.

Figure 7:
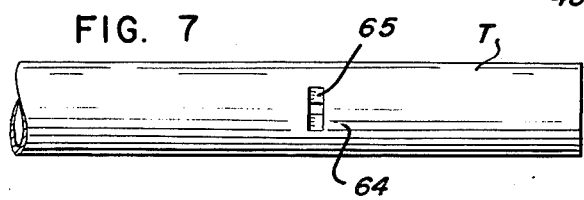
FIG. 7 is a fragmentary plan view of a tube to be cut as upon completion of the notching operation.

In moving from the position of FIG. 1 to the position of FIG. 2, blade cam 23 urges the blade drive bar to the left so as to move the notching tip portion 60 of blade 28 chordally through an upper portion 64 of the tube T, thereby to provide a notch 65 in tube portion 64, as shown in FIG. 7.

Figure 3:
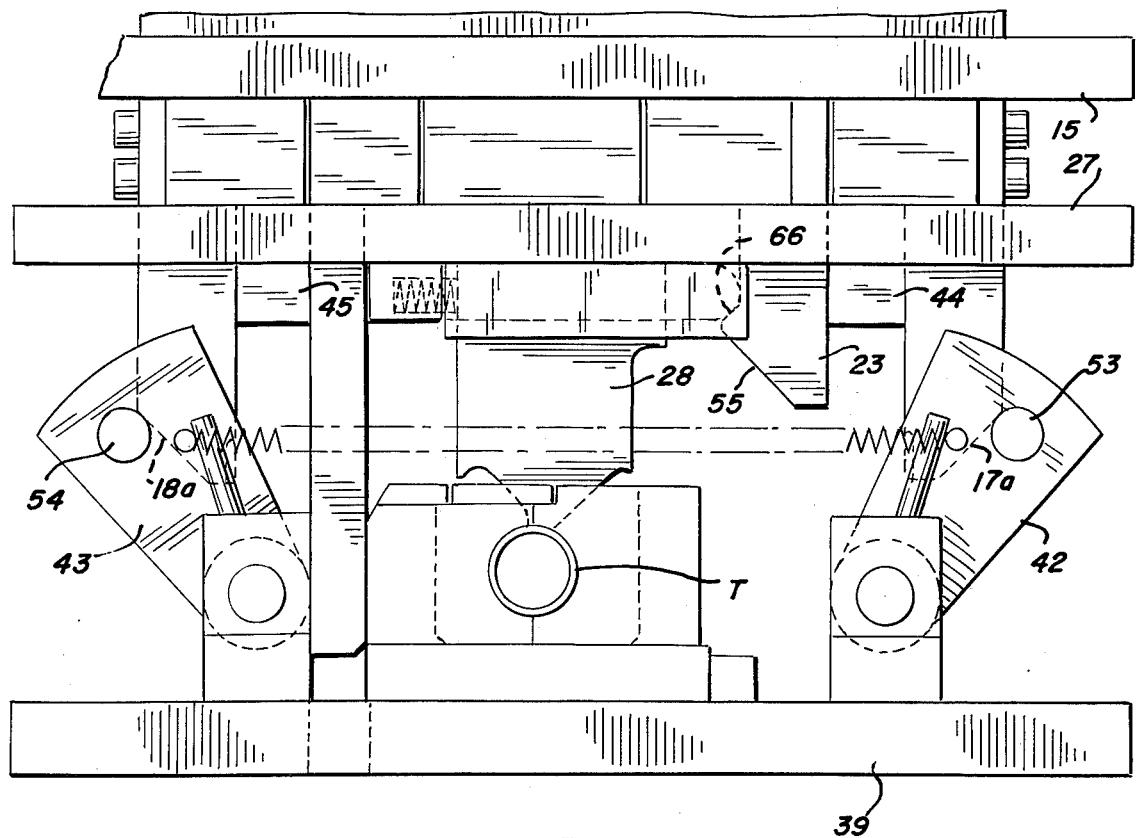
FIG. 3 is a front elevation thereof as arranged at the beginning of the slicing operation.

Cam 23 is further provided with a relief surface 66 above the camming surface 55 which permits the blade drive bar to move to the right from the position of FIG. 2 to a centered position relative to tube T, as shown in FIG. 3, as a result of further downward movement of the upper punch holder portion 15 and cam 23.

Figure 4:
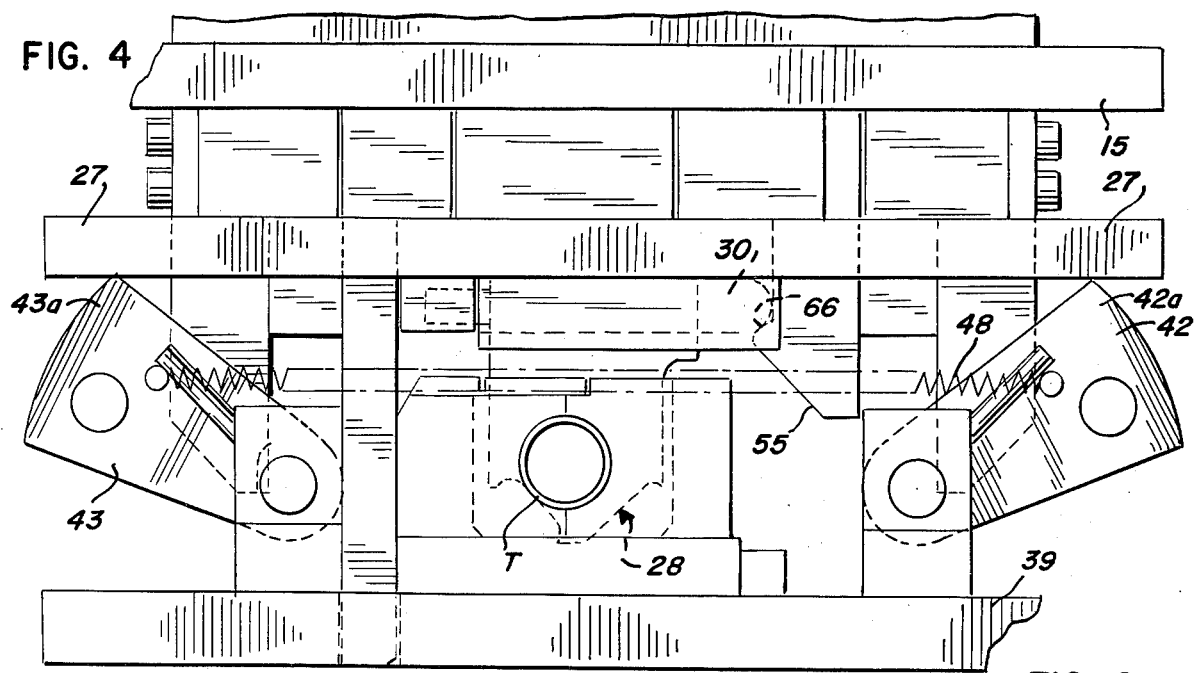
FIG. 4 is a front elevation thereof as arranged at the completion of the cutoff operation.

As lock-up bars 42 And 43 have now been swung out of the path of movement of the stop blocks 44 and 45, the lower punch holder portion may now move downwardly to urge the cutoff blade 28 downwardly diametrically through the tube T to the full cutoff position of FIG. 4. At the end of the downward movement, the lock-up bars 42 and 43 are swung to their outermost positions by engagement of portions 42a and 43a, respectively, with the punch holder portion 27. The tube cutoff is now completed and the apparatus is returned to the start position of FIG. 1 by the return of the punch press punch holders upwardly thereto. During such upward movement, tension spring 48 restores the lock-up bars to the blocking position of FIG. 1 to permit a subsequent tube cutoff in the same manner as described above. At the same time, the blade drive bar is restored to the position of FIG. 1 by the biasing action of spring 57 as permitted by the blade cam surfaces 66 and 55.

Thus, in the present invention, the single cutoff blade effects both the notching, or scarfing, of the tube portion 64 and the slicing through of the tube subsequent to the notching operation. The cooperating cam means of the apparatus provide an improved novel movement of the cutoff blade which effects the dimpleless cutoff of the tube rapidly and efficiently. The apparatus may be utilized in standard punch presses with simple mounting thereof therein and may be utilized in a roll-forming line to continuously cut tubing "on the fly" for improved mass production efficiency.

As the notching operation provides only a small chordal notch, the horizontal die travel is effectively minimized to provide further improved efficiency in the tube cutoff operation.

The foregoing disclosure of specific embodiments is illustrative of the broad inventive concepts comprehended by the invention.

I claim:

1. Tube cutoff apparatus comprising:
   means for supporting a tube to be cut;
   a cutoff blade having a notching tip portion and a slicing edge portion extending away from said notching tip portion; and
   means for moving said blade in a first direction to
   a. firstly cause said notching tip portion to notch a portion of the tube, and in a second direction to
   b. secondly cause said slicing edge portion to slice through the notched tube commencing from the notched portion and continuing therefrom through the remainder of the tube to complete the cutoff operation.

2. The tube cutoff apparatus of claim 1 wherein said blade moving means includes means for moving the tip portion in said first direction chordally through the tube to notch said portion of the tube.

3. The tube cutoff apparatus of claim 1 wherein said blade moving means includes means for moving the blade in said second direction diametrically through the tube to slice therethrough.

4. The tube cutoff apparatus of claim 1 wherein said blade moving means includes means for moving the tip portion chordally through the tube to notch said portion of the tube, means for repositioning the blade to a diameter of the tube extending through the notched portion, and means for moving the repositioned blade diametrically through the tube to slice therethrough.

5. The tube cutoff apparatus of claim 1 wherein said slicing edge portion defines a pair of opposite edges for concurrently slicing opposite portions of the tube in completing the cutoff operation.

6. The tube cutoff apparatus of claim 1 wherein said notching tip portion comprises an arcuate hooked portion.

7. The tube cutoff apparatus of claim 1 wherein said slicing edge portion defines a pair of opposite edges for concurrently slicing opposite portions of the tube in completing the cutoff operation, said edges extending at different angles away from said notching tip portion.

8. Tube cutoff apparatus comprising:
   means for supporting a tube to be cut;
   a cutoff blade having a notching tip portion and a slicing edge portion extending away from said notching tip portion;
   support means for supporting the blade transaxially adjacent the tube;
   means for moving said blade on said support means to cause said notching tip portion to move in a first direction chordally through a portion of the tube to notch said tube portion; and
   means for moving the blade support means to move the blade in a second direction suitably to cause said slicing edge portion to slice through the notched tube commencing from the notched portion and continuing therefrom through the remainder of the tube to complete the cutoff operation.

9. The tube cutoff apparatus of claim 8 wherein said means for moving the blade comprises a cam and means for moving the cam parallel to the slicing movement of the blade to effect the chordal movement of the notching tip portion.

10. The tube cutoff apparatus of claim 8 wherein said means for moving the blade comprises a cam, means for moving the cam parallel to the slicing movement of the blade to effect the chordal movement of the notching tip portion, means for holding the support during said chordal notching movement of the cam, means for repositioning the blade in centered relationship to the tube upon completion of the notching operation, and means for releasing the held support for movement with the cam to effect the slicing operation.

11. The tube cutoff apparatus of claim 8 wherein said means for moving the blade comprises a cam, means for moving the cam parallel to the slicing movement of the blade to effect the chordal movement of the notching tip portion, and means for holding the support during said chordal notching movement of the cam including lock-up bars selectively disposed in the path of movement of the support and lock-up cams mounted for movement with said blade moving cam arranged to remove said lock-up bars from said path of support movement upon completion of the notching operation.

12. The tube cutoff apparatus of claim 11 wherein said lock-up bars are pivotally mounted to said support.

13. The tube cutoff apparatus of claim 8 including means for biasing said blade chordally to a start position wherein said notching tip portion is disposed laterally of said tube portion at the initiation of the notching operation.

14. The tube cutoff apparatus of claim 8 including means for biasing said blade chordally to a start position wherein said notching tip portion is disposed laterally of said tube portion at the initiation of the notching operation and biasing the blade chordally to a centered position relative to the tube at the initiation of the slicing operation.

* * * * *